(12) United States Patent
Braun et al.

(10) Patent No.: US 7,343,042 B2
(45) Date of Patent: Mar. 11, 2008

(54) METHOD AND SYSTEM FOR IDENTIFYING A PAPER FORM USING A DIGITAL PEN

(75) Inventors: John F. Braun, Weston, CT (US); John W. Rojas, Norwalk, CT (US); James R. Norris, Danbury, CT (US); Jean-Hiram Coffy, Norwalk, CT (US); Arthur Parkos, Southbury, CT (US); Alan Leung, New York, NY (US); Wendy Chui Fen Leung, Woodside, NY (US)

(73) Assignee: Pitney Bowes Inc., Stamford, CT (US)

( * ) Notice: Subject to any disclaimer, the term of this patent is extended or adjusted under 35 U.S.C. 154(b) by 663 days.

(21) Appl. No.: 10/065,285

(22) Filed: Sep. 30, 2002

(65) Prior Publication Data

US 2004/0064787 A1 Apr. 1, 2004

(51) Int. Cl.
*G06K 9/46* (2006.01)
*G06K 9/20* (2006.01)

(52) U.S. Cl. .................. 382/203; 382/202; 382/317

(58) Field of Classification Search ............. 382/202, 382/203, 317
See application file for complete search history.

(56) References Cited

U.S. PATENT DOCUMENTS

| | | | |
|---|---|---|---|
| 1,684,756 A * | 9/1928 | Close .................... 462/67 |
| 3,273,123 A * | 9/1966 | Lowitz .................. 382/202 |
| 5,140,645 A * | 8/1992 | Whitaker ............... 382/184 |
| 5,243,149 A * | 9/1993 | Comerford et al. ...... 178/18.03 |
| 5,453,762 A | 9/1995 | Ito et al. ............... 345/179 |
| 5,561,446 A | 10/1996 | Montlick |
| 5,581,682 A | 12/1996 | Anderson et al. ...... 715/530 |
| 5,586,036 A | 12/1996 | Pintsov ................. 705/408 |
| 5,587,560 A * | 12/1996 | Crooks et al. ......... 178/18.03 |
| 5,612,720 A | 3/1997 | Ito et al. ............... 345/179 |
| 5,647,017 A | 7/1997 | Smithies et al. ....... 382/119 |
| 5,684,990 A | 11/1997 | Botthby ................ 707/203 |
| 5,767,496 A | 6/1998 | Swartz et al. .......... 235/462.1 |
| 5,897,648 A | 4/1999 | Henderson |
| 5,903,667 A | 5/1999 | Kuzunuki et al. ...... 382/187 |
| 5,974,177 A * | 10/1999 | Krtolica ................ 382/202 |
| 6,009,416 A | 12/1999 | Pintsov ................. 705/410 |
| 6,050,490 A | 4/2000 | Leichner et al. |
| 6,081,261 A | 6/2000 | Wolff et al. ........... 345/179 |
| 6,091,835 A | 7/2000 | Smithies et al. ....... 382/115 |

(Continued)

FOREIGN PATENT DOCUMENTS

JP 2001-43000 A 2/2001

OTHER PUBLICATIONS www.dictionary.com.*

(Continued)

*Primary Examiner*—Bhavesh M Mehta
*Assistant Examiner*—Jonathan Schaffer
(74) *Attorney, Agent, or Firm*—George M. Macdonald; Angelo N. Chaclas

(57) ABSTRACT

The present application describes systems and methods for composing documents using a digital pointing instrument. In further configurations, a user utilizes a pen to trace a form serial number that is utilized to identify a form template that is used to process input data from a digital pen.

20 Claims, 3 Drawing Sheets

U.S. PATENT DOCUMENTS

| | | |
|---|---|---|
| 6,188,392 B1 | 2/2001 | O'Connor et al. .......... 345/179 |
| 6,201,903 B1 | 3/2001 | Wolff et al. |
| 6,208,771 B1 | 3/2001 | Jared et al. ................. 382/306 |
| 6,229,102 B1 | 5/2001 | Sato et al. ................ 178/19.01 |
| 6,259,043 B1 * | 7/2001 | Clary et al. .............. 178/18.01 |
| 6,307,956 B1 | 10/2001 | Black ......................... 382/124 |
| 6,310,988 B1 | 10/2001 | Flores et al. ................ 382/313 |
| 6,311,042 B1 | 10/2001 | DeSchrijver ................. 455/66 |
| 6,327,395 B1 | 12/2001 | Hecht et al. ................ 382/306 |
| 6,330,976 B1 | 12/2001 | Dymetman et al. |
| 6,396,598 B1 | 5/2002 | Kashiwagi et al. ......... 358/474 |
| 6,422,474 B1 | 7/2002 | Gossweiler, III et al. |
| 6,456,740 B1 * | 9/2002 | Carini et al. ................ 382/187 |
| 6,502,756 B1 | 1/2003 | Fahraeus ................... 235/494 |
| 6,504,956 B1 | 1/2003 | Gannage et al. ............ 382/188 |
| 6,548,768 B1 | 4/2003 | Pettersson et al. ....... 178/18.01 |
| 6,570,104 B1 | 5/2003 | Ericson et al. .......... 178/18.09 |
| 6,573,887 B1 | 6/2003 | O'Donnell, Jr. ............ 345/179 |
| 6,577,300 B2 | 6/2003 | Picoult et al. .............. 345/179 |
| 6,586,688 B2 | 7/2003 | Wiebe ..................... 178/18.09 |
| 6,594,406 B1 | 7/2003 | Hecht ......................... 382/306 |
| 6,609,653 B1 | 8/2003 | Lapstun et al. ............. 235/375 |
| 6,618,040 B1 * | 9/2003 | Mattaway et al. .......... 345/173 |
| 6,627,870 B1 | 9/2003 | Lapstun et al. ............. 250/221 |
| 6,666,376 B1 | 12/2003 | Ericson ...................... 235/454 |
| 6,681,045 B1 | 1/2004 | Lapstun et al. ............. 382/187 |
| 6,694,045 B2 | 2/2004 | Chung et al. ............... 382/119 |
| 6,698,660 B2 | 3/2004 | F'hraeus et al. ........ 235/472.01 |
| 6,773,177 B2 | 8/2004 | Denoue et al. ............... 400/88 |
| 6,795,060 B2 | 9/2004 | Rekimoto et al. .......... 345/173 |
| 6,865,284 B2 | 3/2005 | Mahonet et al. ............ 382/112 |
| 6,895,507 B1 | 5/2005 | Teppler ....................... 726/19 |
| 6,941,510 B1 | 9/2005 | Ozzie et al. ................ 715/513 |
| 6,970,583 B2 | 11/2005 | Black ......................... 382/124 |
| 6,972,864 B2 | 12/2005 | Lapstun et al. ............. 358/1.15 |
| 2001/0051890 A1 | 12/2001 | Burgess .......................... 705/9 |
| 2001/0055411 A1 | 12/2001 | Black ......................... 382/124 |
| 2002/0006212 A1 | 1/2002 | Rhoads et al. .............. 382/100 |
| 2002/0035687 A1 | 3/2002 | Skantze ...................... 713/168 |
| 2002/0054778 A1 | 5/2002 | Erickson et al. .............. 400/76 |
| 2002/0057824 A1 | 5/2002 | Andreasson ................ 382/101 |
| 2002/0065042 A1 | 5/2002 | Picoult et al. |
| 2002/0065101 A1 | 5/2002 | Picoult et al. |
| 2002/0067854 A1 * | 6/2002 | Reintjes et al. ............. 382/199 |
| 2002/0078088 A1 | 6/2002 | Kuruoglu et al. ........... 707/512 |
| 2002/0080386 A1 | 6/2002 | Snowdon et al. |
| 2002/0107885 A1 | 8/2002 | Brooks et al. .............. 707/505 |
| 2002/0126105 A1 | 9/2002 | O'Donnell, Jr. ............ 345/179 |
| 2002/0146170 A1 * | 10/2002 | Rom .......................... 382/175 |
| 2002/0169963 A1 | 11/2002 | Seder et al. ................ 713/176 |
| 2002/0169986 A1 | 11/2002 | Lortz ......................... 713/201 |
| 2002/0193975 A1 | 12/2002 | Zimmerman .................. 703/6 |
| 2003/0001020 A1 | 1/2003 | Kardach ..................... 235/494 |
| 2003/0046256 A1 | 3/2003 | Hugosson et al. ............. 707/1 |
| 2003/0133629 A1 | 7/2003 | Sayers ........................ 382/313 |
| 2003/0214681 A1 | 11/2003 | Bohan ........................ 358/468 |
| 2004/0134690 A1 | 7/2004 | Norris et al. ............ 178/19.01 |
| 2004/0139391 A1 | 7/2004 | Stumbo et al. ............. 715/512 |
| 2004/0205545 A1 | 10/2004 | Bargeron et al. ........... 715/512 |
| 2005/0097337 A1 | 5/2005 | Sesek ......................... 713/186 |
| 2006/0075340 A1 | 4/2006 | Coffy ......................... 715/541 |

OTHER PUBLICATIONS

Anoto Advertising Booklet—"Uniting Handwriting with the Digital World", undated, 15 pages.

Anoto Advertising Booklet—"Hey, Guess What Those Nifty Swedes Have Dreamed Up Now to Revolutionize Digital Communiction?!", undated, 22 pages.

"A Comparison of Anoto Technology with Other Releeant Systems." Undated. 17 pages.

Anoto Functionality—World Wide Web pages from www.anotofunctionality.com. Accessed Jan. 29, 2004. 7 pages.

Unknown Anoto, Subsidiary of C Technologies, Initiates Collaboration with John Dickinson, UK's Leading Producer of Stationary Products, Apr. 23, 2001, Business Wire, 2 pages.

* cited by examiner

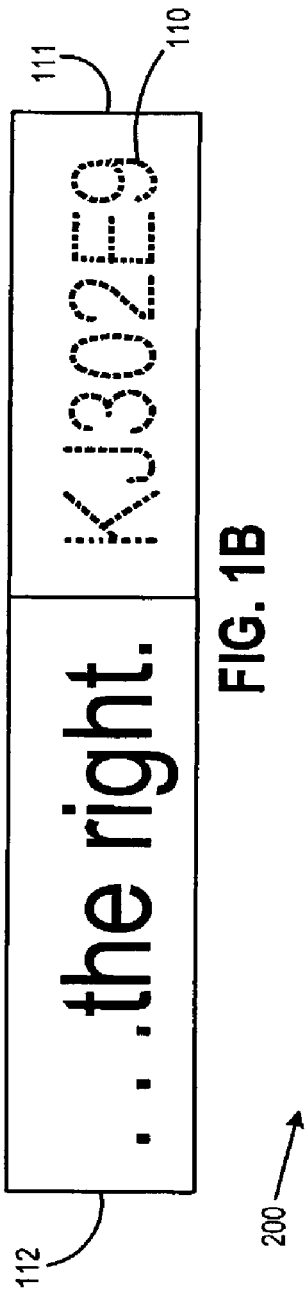

METHOD AND SYSTEM FOR IDENTIFYING A PAPER FORM USING A DIGITAL PEN

BACKGROUND OF INVENTION

The illustrative embodiments disclosed in the present application are useful in systems including those for processing forms and more particularly are useful in systems including those for processing forms using a digital pen.

Traditional paper based forms are used in many situations. Typically, a form will include pre-printed information and pre-printed boxes for data input. A salesman in the field or a customer in a store might fill in such a traditional form. In such a situation, a salesman or customer would fill in some information on the form and the form would be sent to a central processing location by mail or facsimile. The data on the form would typically be scanned or keyed in by an operator.

In using a traditional pre-printed form, the user fills in data input spaces using an ink pen. The form is then sent for processing. Accordingly, the user may not be able to ascertain required information and may submit a partially filled in form.

A reference entitled Apparatus and Method For Editing Electronic Documents is shown in U.S. Pat. No. 5,897,648 issued Apr. 27, 1999 to Henderson and is incorporated herein by reference. The reference describes a system for scanning in an original document and then using a digitizing pen in conjunction with the scanned document.

SUMMARY OF INVENTION

The present application describes illustrative embodiments of systems and methods for generating documents such as by completing forms. In further illustrative embodiments, a user utilizes a pre-printed form having a pre-printed identifier and a digital pen to select a form template identified by the identifier. In a further illustrative embodiment, the identifier identifies the particular unique copy of the form as well as the form type and version.

BRIEF DESCRIPTION OF DRAWINGS

FIG. 1B is a partial exploded view of the schematic representation of a form according to the illustrative embodiment of the present application shown in FIG. 1A.

FIG. 2 is a schematic representation of a data record according to an illustrative embodiment of the present application.

DETAILED DESCRIPTION

Figure 1A:
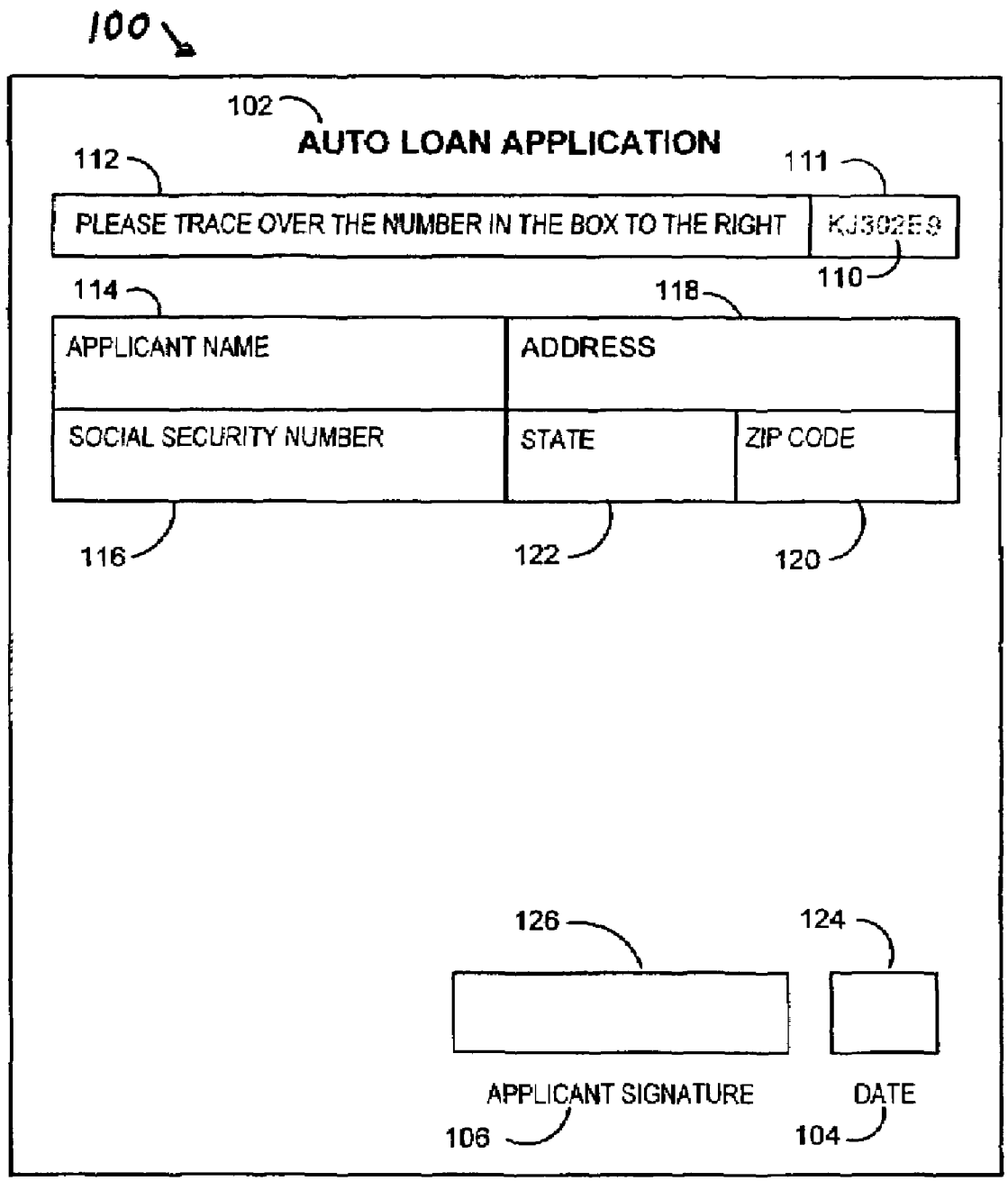
FIG. 1A is a schematic representation of a pre-printed form according to an illustrative embodiment of the present application.

A method and system for identifying a media is shown. In an illustrative embodiment, a system and method for using a digital pen to trace a pre-printed identifier in order to identify a form is shown. In one embodiment, a digital pen and pre-printed serial number is used to determine the unique instance of a form.

When a user is writing on a form using a digital pen, the back end application must already know the type of form being used and the layout of that form in order to interpret the pen strokes of the user. When a traditional plain paper form was used, there was no information available to the digital pen to help identify and extract the fields of information written by the author. An author is a party that uses a digital pen to fill in a form. The form generator is the party that has created the form for use. A form template is developed to identify the layout of the form including the nature and location of fields used in the form that are to be filled in by an author. A serial number is used to identify a type of form and may also be used to identify a particular version of a form or a unique instance of a particular type of form. A digital pen is a pointing device that can be used to input information and is preferably a wireless capable pen sized device that writes using ink and detects and communicates user pen stroke data.

In illustrative embodiments described herein, the application describes using a form identifier such as a form serial number that may be traced over and used by a back end application to identify a particular form being utilized. Accordingly, the back end application could recall a form layout in order to identify the nature and location of particular input fields to be used by an author.

Digital pointing devices such as the pen and tablet systems available from Wacom Technology Corp. of Vancouver, Wash. allow a user to utilize a computer to capture pen strokes that the user traces over a tablet. Digital pointing devices may utilize capacitive sensors or other grid based sensors to determine absolute or relative position of the pointing device.

Digital pens allow a user to capture or digitize handwriting or pen strokes that the user writes on a medium such as a piece of paper by using a processor such as a personal computer. Certain digital pens utilize an imaging device to scan or record an image of the pen stroke. Certain other digital pens use mechanical sensors in order to record a pen stroke. The pen systems may utilize positioning systems such as light-based scanning systems including infrared (ir) sources and detectors in order to determine an absolute or relative position of the pen. Digital pen systems include the N-Scribe system available from Digital Ink of Wellesley, Mass. and the E-Pen system available from E-Pen InMotion of Matam, Haifa Israel. A digital pointing device includes the V-Pen system available from OTM Technologies of Herzliya Israel.

Another digital pen system is the Sony-Ericsson CHA-30 Chatpen and Anoto paper available from Anoto AB of Sweden. The Chatpen typically utilizes a Bluetooth transceiver in order to communicate with a processor and the Anoto paper includes a grid encoding information such position information that is detected by the Chatpen. The pre-printed grid may be used to identify a particular form, but using a unique grid for each form may be cumbersome. Additional information may be captured including information related to pressure, speed and pen attitude. The additional information includes biometric information that may be used to identify or authenticate a user.

A reference describing a handheld writing device is shown in U.S. Pat. No. 6,050,490, issued Apr. 18, 2000 and is incorporated herein by reference.

Commonly owned, co-pending U.S. patent application Ser. No. 09/727,893 and filed Nov. 30, 2000 describes systems for remote retrieval of messages and is incorporated herein by reference.

Commonly owned, co-pending U.S. patent application Ser. No. 09/707,561, filed Nov. 7, 2000 describes systems for remote retrieval of documents and is incorporated herein by reference.

Commonly owned, co-pending U.S. patent application Ser. No. 09/728,237, filed Nov. 30, 2000 describes systems for remote printing of documents and is incorporated herein by reference.

Co-pending U.S. patent application Ser. No. 10/065,281, entitled Method And System For Creating And Sending a Facsimile Using a Digital Pen, filed on even date herewith, is incorporated by reference in its entirety.

Co-pending U.S. patent application Ser. No. 10/065,282, entitled Method And System For Creating a Document Having Metadata, filed on even date herewith, is incorporated by reference in its entirety.

Co-pending U.S. patent application Ser. No. 10/065,283, entitled Method And System For Identifying a Form Version, filed on even date herewith, is incorporated by reference in its entirety.

Co-pending U.S. patent application Ser. No. 10/065,284, entitled Method And System For Remote Form Completion, filed on even date herewith, is incorporated by reference in its entirety.

The Digital Pen

The present application describes systems and methods for composing documents using a pointing device. Certain illustrative embodiments described herein utilize a digital pen that tracks an x-y position and records stroke data. A pen using an infrared transceiver based positioning system is utilized and the pen tip is sensed to detect pen strokes. The position information and stroke information is sent to a processor that processes pen input. The processor (not shown) is connected to the pen and position sensor transceiver using a wireless connection such as Bluetooth and is a Pentium 4 Dell computer using Windows XP with wireless connectivity. Alternatively, a PDA such as a Casio PDA may be used with a wired serial interface. However, other sensing devices may be utilized to compose other documents, such as a Chatpen using Anoto paper and a pattern lookup server.

The digital pen is utilized to capture information regarding the pen strokes made by a user. In the illustrative embodiments described herein, an Anoto Chatpen is described in order to differentiate different forms using the same underlying pattern. Toolkits available from Anoto AB are utilized to process stroke data and also biometric data including stroke data. Document generation is accomplished using Word and VBA available from Microsoft of Redmond, Wash. Additionally, development tools and customizable applications available from Microsoft may be utilized. In an alternative embodiment, an infrared-based digital pen is utilized.

However, other digital pens may also be utilized. Certain digital pens utilize position determination in order to determine the actual location of the pen on a piece of paper in order to provide a relative location in terms of the location in the space of the piece of paper. Certain digital pens scan the ink as it is applied to digitize a stroke while others sense the stroke using sensors such as pressure sensors, Doppler sensors, accelerometers and other sensing mechanisms.

The Chatpen and Anoto paper provide a pen that writes using ink on paper printed with an Anoto pattern. The Chatpen includes a sensor to detect the Anoto pattern. The detected pattern identifies the relative pen location on a grid of the pattern using a pattern look-up processor that may be locally or remotely located. The relative location allows the pen stroke and pattern look-up processor to determine where the pen is on a defined logical space of the pattern. Certain logically defined two-dimensional areas of the pattern may be defined as representing certain functions. For example, Anoto paper may be printed with a box that includes a particular portion of the pattern that is attributed the meaning of "Send Form." The Anoto pattern may be utilized to determine the type of pre-printed form being utilized and the company that should receive the data. However, as described below, the Anoto pen may be used with different forms having the same underlying pattern by using a traceable indicator such as a form number.

Using the Chatpen, the stroke, biometric and pattern position information is sent to the pen stroke processor via a wireless Bluetooth™ communications channel that is secure across a personal area network. A pattern lookup processor may be local to the document composition processor or may be remotely linked via a communications channel such as the Internet. Alternatively, an Intranet may be utilized in place of the Internet. As shown herein, a completed document or form is composed and delivered according to strokes made on a pre-printed form.

The illustrative embodiments describe methods and apparatus for identifying a form using a traceable indicator such as a form number. Additional methods for identifying a form are described. The processes and apparatus described may be implemented using hardware, software or a combination of both. The communications channels may be wireless or wired and may utilize security techniques such as encryption. The data storage and data processors may be locally or remotely located.

The Paper Form

Referring to FIG. 1, an illustrative form 100 is used to describe an illustrative embodiment describing a digital pen form identification and composition service system.

The Digital Pen includes a processor, memory, ink, a camera or image sensor, a battery and a wireless transceiver (not shown). It also includes biometric sensors (not shown). In an alternative, the ink is machine detectable. In another embodiment, the ink is invisible.

The form 100 is identified as an Auto Loan Application form 102 printed on paper. Section 112 provides instructions to the user so that the user will know to trace over the form number 110 using the digital pen. In this embodiment, the form number must be located in that location for every form that is processed by the back end application (not shown). In an alternative, the form recognition system may continue to process and store pen strokes without knowing the underlying form type until the back end application recognizes the trace over for a form serial number.

The form 100 includes an Applicant Name field 114, an Address field 118, a Social Security Number field 116, a state field 122 and a zip code 120.

The form also includes a signature box 126 having indicator 106 and a date input field 124 having an indicator 104.

In one embodiment, the digital pen is a Chatpen using a Bluetooth™ transceiver. Bluetooth™ utilizes several layers of security. At a link level, remote/local device authentication is required before any communication can take place. At the Channel level, a link level connection occurs and then the devices need to authenticate before a communications channel is established. Additionally, the data payload being transmitted may be encrypted. In this embodiment, appropriate security at several protocol layers is utilized including the application layer.

In an alternative, the pen includes audio input/output including synthesized voice output and voice recognition. Visual output is provided using an LCD display and LEDs and tactile feedback is provided using servomechanisms. Physical input includes an input button.

The connections between the pen (not shown) and the processor (not shown) could be over private lines or may be a Virtual Private Network. It is contemplated that all of the connections utilize appropriate security measures.

Other well-known input devices, servers, processors, networks and communications mechanisms may be used. The back-end application (not shown) is utilized to process pen strokes. The back end application then recognizes form identification strokes in box 110 to identify the form so that it can attribute the other strokes with the particular form template. In an alternative, pen strokes are stored until the form is identified.

The data written by a user in a particular data input flied can be rasterized and then subjected to Optical character recognition (OCR) in order to identify the data written by the user.

The present embodiment may alternatively use any pen or stylus like device that provides for electronically recording strokes. Position information may be processed into strokes or transmitted in a separate data stream.

Here, the digital pen system utilizes a pen and system that can continuously track the movement and location of the pen and record pen stroke data. Some pen stroke data may be buffered in the pen before the data is sent to the back end application. The pen system can wirelessly transmit or store and transmit tracking data in the pen stroke data. The digital pen can submit the form to the back end application as a transaction. The form generator includes a form serial number on the paper form being distributed for use by the authors. Each form type has a different serial number that is preferably pre-printed on the form using a traceable font having dashed lines as shown in 110. When the user traces the form serial number, the back end application receives the information and recalls a form template and other data in order to process the pen strokes.

Referring to FIG. 1B, a exploded view of a portion of form 100 is shown. In this embodiment, the form number 110 is located in box 111 and is printed in a dashed outline font. A user will then be able to trace over the characters and know what characters have been traced over by determining which have been filled in.

Referring to FIG. 2, a schematic representation of a data structure stored by the back end application on the processor (not shown) is described. Here, the preprinted form 100 has several field names such as the serial number 110 that is associated with the data structure 200 as serial number 210 having a field type 222 and a field location 224 that defined the two dimensional space on the form dedicated to that field. The data structure has columns including the field name 210, field type 212 that defines a data type and field location 214 that defines a two dimensional space for the item on the form. The serial number has associated fields 220, 222, 224. The Applicant name is associated with fields 230, 232, 234. The Address is associated with fields 240, 242, 244. The City is associated with fields 250, 252, 254. The Zip Code is associated with fields 260, 262, 264. The Social security number is associated with fields 270, 272, 274. The Applicant signature is associated with fields 280, 282, 284. The Date is associated with fields 290, 292, 294.

The form generator will generate the form template when creating the form and will associate the template and related data with a particular form serial number. The serial number form can be placed anywhere on the form when it is created, but it is preferably placed near the top of the form. In some uses of the system, the serial number is traced first. However, the pen or back end system could store stroke data until the form serial number is parsed and then process the stroke data in accordance with the recalled template. The form template is preferable used to generate and print the copies of the form that are to be used. The forms may be made available in the form of a computer file that can be printed and then used with a digital pen.

Supplemental text 112 instructs the user in tracing the serial number 110 on the form 100. The digital pen may transmit pen stroke data to the back end application while it is being written. Alternatively, the part or all of the transaction of filling in the form may be stored in a buffer in the digital pen and later transmitted to the back end application for processing.

The back end process may then process the completed form as a transaction. The back end process can then locate the serial number field in the data and extract the serial number using a character recognition technique such as Optical Character Recognition (OCR). In this scenario, the back end application need not detect the characters of all of the stroke data and may use the template to apply the strokes as graphical information rather than live detected text. In an alternative, all or some of the rest of the stroke data may be recognized using an OCR algorithm.

Figure 3:
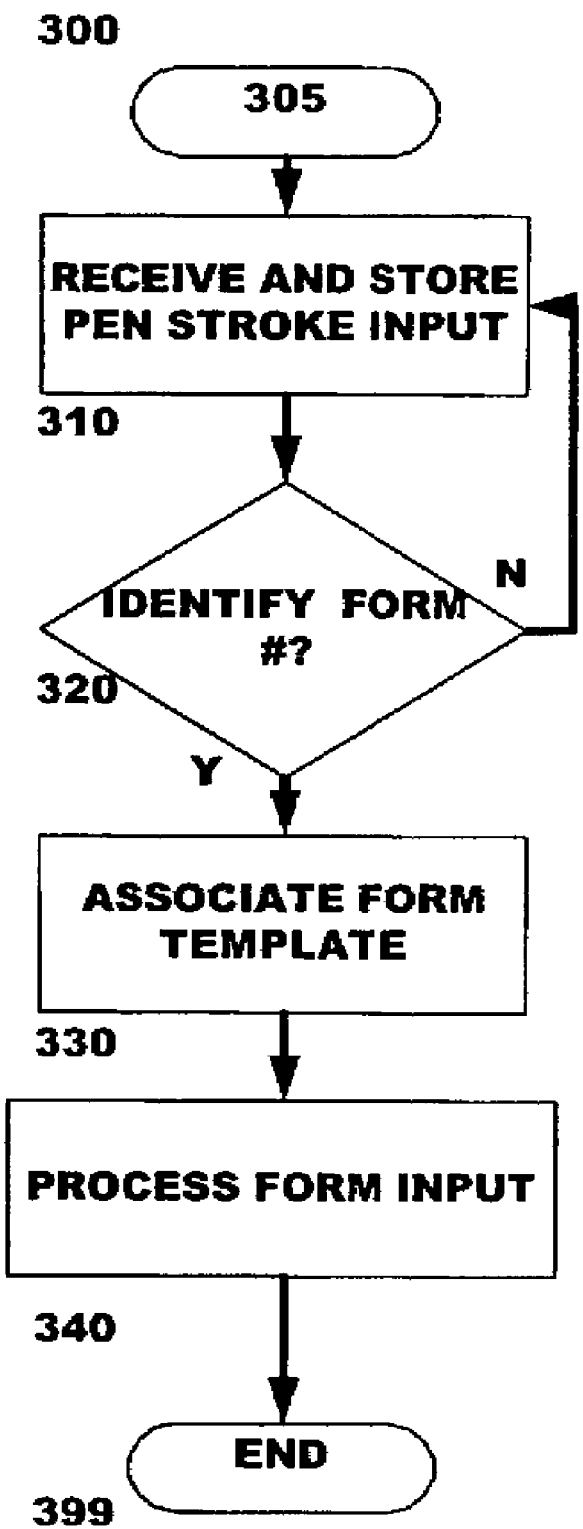
FIG. 3 is a flow chart showing a process for selecting a version of a form according to another illustrative embodiment of the present application.

In an example using a serial number that is not placed in a particular location of the form, the serial number may be pre-printed using a particular font in a traceable format that the back end process is programmed to detect. Similarly, a specific number of characters may be assigned to the serial number or a control string of characters could be used that is not likely to appear in a normally filled in form. Additionally, non-alphanumeric characters such as special characters or symbols may be used to enable the back end application to recognize the unique form indicator or serial number. In such situations, the back end application could scan all of the stroke data or some data that meets certain font or other guidelines while comparing that detected text to a lookup table of valid serial numbers in order to properly associate a template to the form Referring to FIG. 3, a process for identifying a form template is described. The process beings in step 305 and the form processor receives and stores pen stroke input data in step 310. Here, the pen stroke data may be a data feed in the wireless channel or data sent from a paired device such as a cellular phone that stores some stroke data and then communicates it through the Internet to a form processor. In step 320, the form process 300 determines if the form type serial number has been determined. If the form is not identified, the process returns to step 310 to receive additional pen stroke data. If the form is identified, the process proceeds to step 330 to parse the input and any commands and data as expected from the form template. The process 300 continues to process the form data in step 340 until the process is completed in step 399. The back end application may check for an end of form indication such as the use of the signature block or the lapse of a certain period of time in the user input stream.

Known systems such as C++ or Word and VBA may be utilized for a back end application. The Anoto toolkit may be utilized. The authentication data may be used to ensure that only authorized users have access to the forms and data.

In an alternative applicable to any of the embodiments described, the form processor can use the pen stroke data and pen identification data to determine if the salesman or user has authority to use the particular form.

In any of the described embodiments, error indications or messages may be communicated using LED indicators, a display such as an LCD display or audio indications such as beeps or synthesized speech using a speaker. Additionally, tactile feedback may be utilized to indicate an error condition or provide other feedback such as an indication that a form was successfully identified and completed.

The present application describes illustrative embodiments of a system and method for composing documents using a pointing device and in one embodiment describes a digital pen system for detecting a form version using a digital pen. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for processing form input data comprising:
   capturing user stroke data from a form including strokes made by a user with a pointing device by tracing over at least one form identifier character that is pre-printed on the form;
   processing the strokes in order to determine form identification data;
   receiving user identification data;
   retrieving a form template using the form identification data;
   determining if the user is authorized to use the form template; and
   processing the form input data using the form template if the user is authorized to use the form template.

2. The method of claim 1 wherein the pointing instrument is a digital pen and strokes are provided by the user writing on a paper form.

3. The method of claim 2 further comprising:
   processing a pre-determined portion of the stroke data corresponding to at least one control string character to determine the form identification data; and
   receiving user pen stroke data from at least one data field of the form before processing the strokes in order to determine the form identification data.

4. The method of claim 2 wherein:
   processing stroke data that satisfies pre-determined criteria to determine the form identification data.

5. The method of claim 4 wherein:
   the pre-determined criteria includes font criteria.

6. The method of claim 2 wherein the form identification data includes a form serial number printed on the form, wherein the form serial number identifies a particular instance of a use of a form template.

7. The method of claim 6 wherein the form serial number printed on the form includes a dashed font.

8. A system for processing form input data comprising:
   a processor;
   a storage device connected to the processor;
   the storage device storing a logic program;
   the processor operative with the logic program to perform:
   capturing user stroke data relating to strokes made by a user with a pointing device corresponding to at least one form identifier character that is pre-printed on the form;
   processing the strokes in order to determine form identification data;
   receiving user identification data;
   retrieving a form template using the form identification data;
   determining if the user is authorized to use the form template; and
   processing the form input data using the form template if the user is authorized to use the form template.

9. The system of claim 8 wherein the pointing instrument is a digital pen and strokes are provided by the user writing on a paper form.

10. The system of claim 9 further comprising the processor operative with the logic program to perform:
    processing a pre-determined portion of the stroke data corresponding to at least one control string character to determine the form identification data; and
    receiving user pen stroke data from at least one data field of the form before processing the strokes in order to determine the form identification data.

11. The system of claim 9 further comprising the processor operative with the logic program to perform:
    processing stroke data that satisfies pre-determined criteria to determine the form identification data.

12. The system of claim 11 wherein:
    the pre-determined criteria includes font criteria.

13. The system of claim 10 wherein:
    the pre-determined portion of the stroke data is related to a pre-determined physical portion of the form; and
    the form identification data includes a form serial number printed on the form.

14. The system of claim 13 wherein the form serial number printed on the form includes a dashed font.

15. The method of claim 1 further comprising:
    processing the strokes in order to determine a unique instance data identifier for the particular form.

16. The system of claim 8 further comprising the processor operative with the logic program to perform:
    processing the strokes in order to determine a unique instance data identifier for the particular form, and wherein
    the character set includes non-alphanumeric characters.

17. The method of claim 2, wherein:
    the user identification data includes pen stroke data.

18. The method of claim 2, wherein:
    the user identification data includes pen identification data.

19. The system of claim 9, wherein:
    the user identification data includes pen stroke data and pen identification data.

20. A method for processing form input data comprising:
    capturing user stroke data from a form including strokes made by a user with a digital pen on a digital paper form;
    processing the strokes in order to determine a subset of the user strokes consisting of form identification data by searching the stroke data for predetermined symbols associated with form identification data;
    retrieving a form template using the form identification data; and
    processing the form input data using the form template, wherein the subset of strokes is not located in a fixed location on the digital paper form.

* * * * *